United States Patent [19]

Hack et al.

[11] Patent Number: 4,606,478
[45] Date of Patent: Aug. 19, 1986

[54] DEVICE FOR CONTROLLING ECTOPARASITES

[75] Inventors: Richard J. Hack, Wilmington, Del.; Jakie A. Hair, Stillwater, Okla.; John N. Hall, Newark, Del.; John L. Alexander, Wilmington, Del.; Stanley D. Samluk, Newark, Del.

[73] Assignee: NOR-AM Chemical Company, Wilmington, Del.

[21] Appl. No.: 535,650

[22] Filed: Sep. 26, 1983

[51] Int. Cl.⁴ .............................................. B67D 3/00
[52] U.S. Cl. .................................. 222/187; 119/156; 239/47
[58] Field of Search .................. 222/187; 119/156; 239/47, 44

[56] References Cited

U.S. PATENT DOCUMENTS

| 2,699,779 | 1/1955 | Lustig | 222/187 |
| 2,766,069 | 10/1956 | Tennyson | 239/44 |
| 3,176,882 | 4/1965 | Meermans | 222/187 |
| 3,935,839 | 2/1976 | Goodwin | 119/156 |
| 4,280,658 | 7/1981 | Ehrrich | 222/187 |

FOREIGN PATENT DOCUMENTS

| 1020131 | 4/1950 | France | 222/187 |
| 441736 | 11/1948 | Italy | 239/44 |

Primary Examiner—Joseph J. Rolla
Assistant Examiner—Kenneth Noland
Attorney, Agent, or Firm—Connolly & Hutz

[57] ABSTRACT

A device for dispensing liquid pesticide while attached to an animal. The device comprises a sealed reservoir for the liquid pesticide, a fibrous wick of less than 3 millimeters diameter in communication with the reservoir and through which liquid pesticide passes out of the reservoir into the atmosphere, and separate venting device for preventing negative pressure from developing in the reservoir.

5 Claims, 3 Drawing Figures

U.S. Patent    Aug. 19, 1986    4,606,478
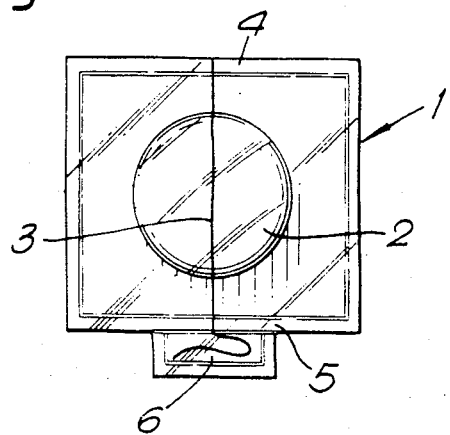
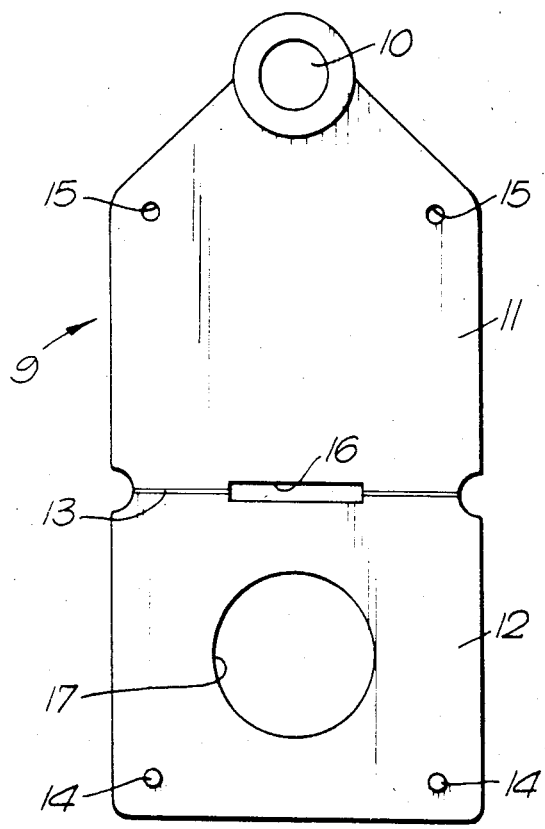
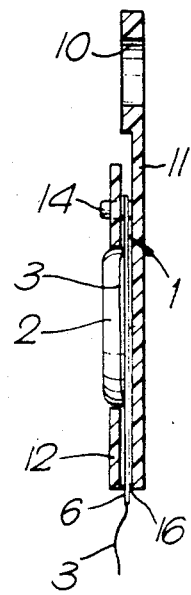

DEVICE FOR CONTROLLING ECTOPARASITES

This invention relates to a device to be attached to animals for the control of insects, arachnids, and other ectoparasites.

In U.S. Pat. No. 3,935,835 a device is disclosed for repelling face-flies from an animal's face in which liquid insecticide is dispensed from a container attached to the animal's ear via a wick. The wick shown in this patent is very large and flat and causes liquid to be depleted very rapidly. In U.S. Pat. No. 4,023,532, the inventor has attempted to overcome this problem by having a knot in the wick in the reservoir to restrict the flow of liquid. However, the devices disclosed in this patent are not practical and still show a relatively thick wick which will not give a controllable and sufficiently low rate of flow of liquid.

To achieve a sufficiently low rate of flow a very fine wick is required, i.e., comprising a fiber having a diameter of less than three millimeters. The release rate can be regulated by the diameter and length of the exposed wick. However, the use of such a fine wick results in negative pressure building up inside the reservoir of liquid as liquid moves along the wick and after a short time little or no more liquid will pass along the wick.

Thus, according to the invention, there is provided a device for dispensing liquid pesticide which comprises a reservoir of liquid pesticide which can be attached to an animal, a fibrous wick having a diameter of less than three millimeters communicating with the liquid in the reservoir, said wick extending outwardly and sealably from the reservoir, whereby liquid can pass out of the reservoir only along the wick, and venting means in the reservoir to prevent negative pressure developing inside the reservoir.

In the preferred aspect, venting is provided by having the end of the wick, which does not communicate with the liquid, passing out of the reservoir and being exposed to the atmosphere.

Alternatively, the reservoir can be provided with valve means to provide a vent. Another arrangement is to have a small piece of fibrous material, which allows passage of air but not liquid, to be positioned in the outer section of the reservoir.

To prevent soiling of the wick, it is preferably made of a synthetic material, e.g., polytetrafluoroethylene. The reservoir is preferably retained on the animal's body by means of an ear tag to which the reservoir can be attached. If desired, the reservoir can be an integral part of the tag or alternatively be separable and a new reservoir attached to the tag when the previous one is depleted.

It may be desirable for the reservoir to be divided into two or more sections, each with its own wick so that two or more chemicals may be dispensed separately.

The invention is illustrated with reference to the accompanying drawings in which FIG. 1 shows a reservoir according to the invention.

FIG. 2 shows a tag for holding the reservoir of FIG. 1; and

FIG. 3 is a section view of the reservoir held in position in the tag.

Referring to the drawings, the reservoir consists of a thin sachet usually of clear plastic material having a bulbous or thicker portion 2 for containing the major amount of an insecticide in liquid form. Wick 3 passes through the liquid and through heat sealed sections 4 and 5. A lower section of the sachet 6 can be cut away to expose the wick when the device is to be used. An alternative arrangement is to have the wick covered by an adhesive strip of material which can be removed to expose the wick. The other end of the wick does not protrude beyond its top of sachet but its end is exposed to the atmosphere to provide a vent. Liquid can thus pass out the reservoir slowly along the lower part of the wick.

In FIG. 2 a tag 9 has a conventional opening 10 in the upper part to allow it to be attached to a cow's ear. The tag consists of two parts 11 and 12 which can be folded together along line 13 and held together by means of studs 14 which clip into holes 15. A section 16 is cut away to allow the lower section 6 of the sachet to pass through and hence enable the lower end of wick 3 to be exposed. Part 12 of the tag has a cut away portion 17 to receive the bulbous section 2 of the sachet.

FIG. 3 shows the sachet in position with the tag folded together. When the sachet is empty the tag can be opened and the halves of the tag can be separated and the old sachet replaced by a new one.

In an alternative arrangement the reservoir is integral with the tag, e.g., by heat sealing the two portions 11 and 12 together. If desired, the back of the reservoir can be integral with the tag portion 11. Although the drawings show the wick exposed at the bottom of the tag, the wick can be exposed at another part of the tag, e.g., at the sides or the top.

The device of the invention can be used for treating ectoparasitic infection on animals, e.g., cats, dogs, pigs, sheep, goats and especially cattle. The infections which can be controlled depend on the nature of the chemical agent. Suitable agents include one or more of the following: amitraz; chlordimeform; carbamates, such as bendiocarb, propoxur and carbaryl; organophosphates, such as naled, dioxathion, phosmet, diazinon and dichlorvos; and pyrethroids such as permethrin, cypermethrin, fenvalerate, deltamethrin, cyhalothrin, flumethrin, and cyfluthrin.

What is claimed is:

1. A device for dispensing liquid pesticide comprising a reservoir of liquid pesticide, a fibrous wick extending through said reservoir in communication with said liquid pesticide, said wick having a first end and a second end remote from said first end, said first end extending sealably outwardly beyond said reservoir to comprise a means for applying the pesticide to an animal by means of a wicking action, said second end being exposed to the atmosphere to prevent a negative pressure developing inside said reservoir, said wick having a diameter of less than three millimeters, means for attaching said device to an animal, said end of said wick which comprises said applicating means being maintained in a sealed chamber to seal said wick end from the atmosphere until the time of intended use, including a tag having a fold line to comprise a first part on one side of said fold line and a second part on the other side of said fold line, said parts being folding into contact with each other with said reservoir therebetween, said reservoir being in the form of a bulbous sachet, and one of said tag parts having a cut away portion through which said sachet protrudes.

2. A device as claimed in claim 1 in which said wick is made of synthetic material.

3. A device as claimed in claim 1 in which said wick is made of polytetrafluoroethylene.

4. A device as claimed in claim 1 wherein said sachet includes a lower sealed section in which said first end of said wick is disposed before the time of intended use, said tag including a cut away portion at said fold line, and said lower section of said sachet extending through said fold line cut away portion whereby said lower section is readily accessible to the use to be severed for exposing said first end of said wick at the time of intended use.

5. A device as claimed in claim 4 wherein said attaching means includes an opening extending through said tag.

* * * * *